Sept. 9, 1969         M. SLAVIN         3,465,588
FLOATLESS ELECTRICAL FLUID LEVEL GAUGE
Filed Sept. 11, 1967
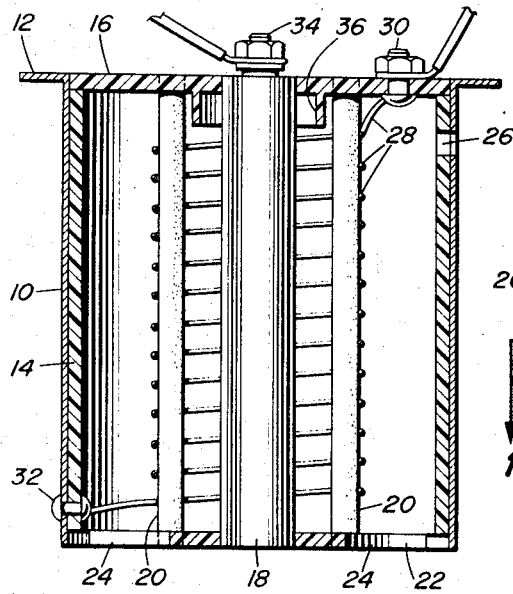
FIG. 1.
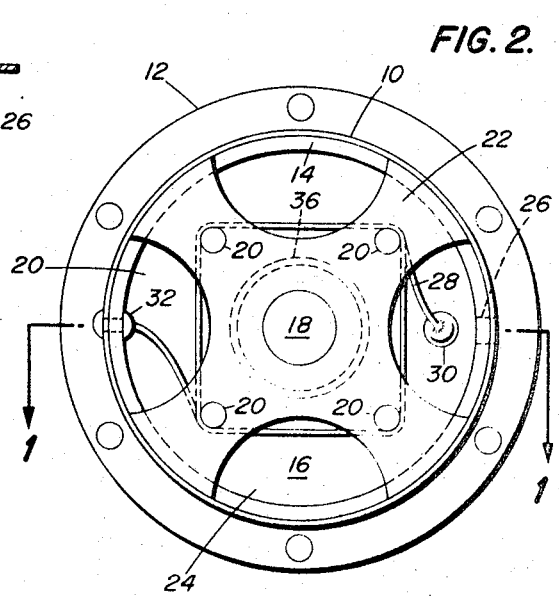
FIG. 2.
FIG. 3.
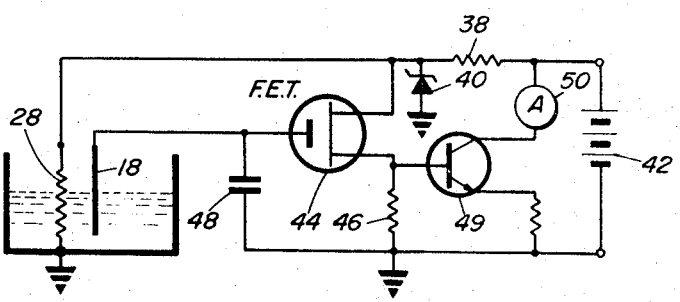
FIG. 4A.
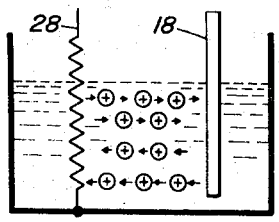
FIG. 4B.
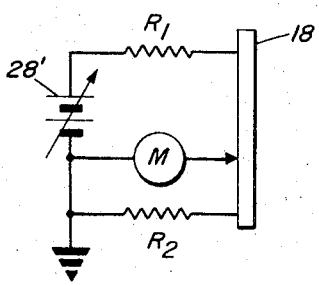
INVENTOR
MICHAEL SLAVIN
BY
ATTORNEY United States Patent Office 3,465,588
Patented Sept. 9, 1969

3,465,588
FLOATLESS ELECTRICAL FLUID LEVEL GAUGE
Michael Slavin, Baltimore, Md., assignor to The Bendix
Corporation, Baltimore, Md., a corporation of Delaware
Filed Sept. 11, 1967, Ser. No. 666,766
Int. Cl. G01f 23/00
U.S. Cl. 73—304                                          14 Claims

ABSTRACT OF THE DISCLOSURE

A floatless fluid level gauge has an immersible element for creating a potential gradient in the fluid and an immersible probe adjacent said element which assumes a potential dependent upon the fluid depth or level. Level is indicated by measurement of probe potential.

The present invention relates to fluid level gauges. More particularly, it relates to a floatless, electrically operated gauge for remotely indicating the depth of fluid in a storage tank.

Floatless gauges have been used heretofore for the purpose of indicating the quantity of fuel or other liquid contained by a vessel. Such gauges are advantageous for vehicular use since they are not ordinarily affeced by the forces of motion. Further, the sensor or tank unit contains no moving parts so that the reliability and service life of floatless gauge can be expected to be greater than gauges depending upon mechanical motion of a sensing element.

One prior form of floatless gauge is constructed as a capacitor suspended within the liquid so as to be immersed by a variable amount as the level of the liquid rises and falls. Variation in the liquid level causes a corresponding variation in the capacity of the sensor because an interface exists in the dielectric medium separating the sensor electrodes. The dielectric for the exposed portion of the electrods is usually air, although it may be another gas or vapor, all of which have dielectric constants very nearly equal to unity. The submerged portion of the sensor electrodes, however, are subjected to a dielectric with a markedly different constant than that of air. It is possible, therefore, to measure the capacity of the sensor and to relate the measured capacity to the level of the liquid in which the sensor is immersed.

Capacitive gauges possess the advantages of ruggedness and insensitivity to motion desired in a floatless gauge. However certain disadvantages are present. The calibration of the gauge, and therefore its accuracy, depends upon the value of the dielectric constant of the immersing liquid. Any changes in this constant caused by temperature variation, alteration of the composition of the fluid, or other phenomena will cause an erroneous gauge reading unless secondary compensation means are provided. Such means complicate the indicating apparatus and tank installation and add appreciably to the total cost of the system. Further, electrical capacity cannot easily be measured by simple, direct reading instruments. Usually, electrical capacity must be measured in a reactance bridge circuit which requires additional standardized or calibrated reactive elements, an alternating voltage source, and a current null detector. Consequently the circuitry and apparatus ancillary to capacitive type sensors is often elaborate, costly and less reliable than the simplicity of the sensor itself would suggest.

The principal object of the present invention is therefore to provide a floatless gauge for sensing and remotely indicating fluid levels and which is distinguished by simplicity of structure and independence from the quality or character of the fluid being measured. Thus, it is the prime object of the invention to provide a gauge which produces accurate fluid level indications in spite of variations in the physical characteristics of the fluid due to temperature change, dilution or contamination of the fluid and which is accurately operable with a wide variety of fluids.

A further object of the invention is to provide gauging apparatus which operates from a direct current source, which utilizes simple, direct reading indicators and which reduces ancillary circuitry and components to a minimum.

Another object of the invention is to provide gauging apparatus in which a linear indication of the volume of fluid contained by an irregularly shaped vessel or tank can be obtained by simple design variations in the gauge sensor.

These and other objects of the invention will become evident as an understanding of the construction and operation thereof is gained from the following description and the accompanying drawings.

Briefly, the invention comprises a fluid level sensor which includes a resistance element continuously excited by direct current and a potential probe. The resistance element and probe are immersed in the fluid so that the resistance element establishes a potential gradient in the fluid. The potential probe is positioned to receive ionic currents induced in the fluid by the potential gradient. The action of the ionic currents is such that the potential of the probe is raised to a value of one-half the potential at the surface of the fluid. Since the potential at the fluid surface depends upon the depth of the fluid, the potential of the probe is a direct indication of the fluid depth. Means are provided for remotely indicating the probe potential and consequently the fluid depth.

In the drawings:

FIG. 1 is a sectional elevation view of the sensor of the invention;

FIG. 2 is a bottom view of the sensor of FIG. 1;

FIG. 3 is a schematic diagram showing the sensor and circuit for remote indication of fluid levels; and FIG. 4 is an analogous circuit useful in explaining the operation of the invention.

FIGS. 1 and 2 illustrate one embodiment of the sensor of the invention. The sensor comprises an outer cylinder 10 formed with a mounting flange 12 from which the unit may be suspended in a tank (not shown). Cylinder 10 is brass or metal to provide an electrostatic shield for the elements contained therein. A cylinder 14 of insulating material is fit snuggly within cylinder 10 for further shielding purposes. The upper ends of cylinders 10 and 14 are closed by an insulating disc 16 from which are suspended a conductive potential probe 18 and four symmetrically spaced insulating rods 20. The probe 18 and rods 20 extend axially through cylinder 10 to a bottom supporting spider 22 which is of insulating material. As best seen in FIG. 2, spider 22 provides openings 24 to permit the free entry into the lower end of the sensor, while a vent 26 (FIG. 1) at the upper end of the sensor permits air to exhaust from or to enter the cylinder more or less freely so that fluid level within the sensor equals that of the tank without. The vent 26 and openings 24 may be designed to throttle or damp the flow of fluid into and out of the sensor so that rapid changes in fluid level due to sloshing or surface waves of the fluid are attenuated.

A length of resistance wire 28 is wound helically about rods 20 to extend from an upper insulated terminal 30 to a lower terminal 32 which contacts cylinder 10 and is grounded thereby to the tank. Probe 18 is connected by a terminal 34 to the external indicator circuit shortly to be described. The accuracy of the gauge can be seriously affected by leakage currents flowing between terminals 30 and 34 across the surfaces of disc 16. Such leakage can be reduced to a negligible value by forming disc 16 with one or more guard rings 36.

The gauge is shown schematically in FIG. 3 to which reference is now made for a description of the indicator circuit. The potential gradient means comprised by the resistance wire helix 28 is connected between the positive terminal of a regulated voltage source and ground, the latter connection being conveniently made through the sensor housing and the tank wall, which obviously must be metal. If insulating material is used for the tank, a separate ground connection is required.

The regulated voltage source is provided by a dropping resistor 38 and Zener diode 40 connected to the positive terminal of a battery 42. The negative battery terminal is grounded. Potential probe 18 is connected to the gate electrode of a field effect transistor 44, the source and drain electrodes of which are connected between the positive regulated voltage source and ground and include in circuit a load resistor 46. An integrating capacitor 48 connected between probe 18 and ground smooths minor variations in the potential of the probe. The field effect transistor presents an extremely high input impedance, thus reducing quiescent current flow from probe 18 to the vanishing point. The output of transistor 44, appearing across load resistor 46, is amplified in a conveniently connected transistor 49, the collector circuit of which includes a conventional milliammeter 50 of either the d'Arsonval or thermal type. The meter 50 is situated for convenient observation and preferably calibrated in terms of fluid level rather than current.

FIGS. 4A and 4B illustrate the theory of operation of the invention. In FIG. 4A it will be seen that the potential gradient produced vertically within the fluid by current flowing in the resistance element 28 causes the migration of fluid ions away from the element 28 towards the probe 18 in the upper portion of the fluid. In the lower portion of the fluid, ionic flow is reversed, with the ions being repelled by the higher potential of the probe towards the lower potential of the lower portions of element 28. Probe 18 is isolated from any external potential source. It will therefore have an equilibrium potential such that the ionic current it receives balances the ionic current it discharges. This condition is represented in the equivalent circuit of FIG. 4B.

In this figure, the potential gradient created by element 28 is replaced by an equivalent voltage source 28' providing a variable output dependent upon the depth of the fluid. The lumped resistance $R_1$ is representative of the total resistance to ionic current flowing through the fluid towards probe 18, while the lumped resistance $R_2$ represents the total resistance to current flow in the opposite direction. It is unnecessary to attempt to evaluate resistors $R_1$ and $R_2$ since the important factor is that the value of resistor $R_1$ is equal to the value of resistor $R_2$. It is clear, therefore, that resistors $R_1$ and $R_2$, connected in series across the voltage source 28', form a voltage divider and that the voltage measured between the junction of resistors $R_1$ and $R_2$ (probe 18) and ground is equal at all times to one-half the voltage of the source 28. Because of the equality of resistors $R_1$ and $R_2$, the probe voltage is always related to the source voltage by the constant factor of one-half, no matter what the actual value of either resistor. Therefore, these resistances may be varied by any means or cause; for example, by changing the composition of the fluid or by varying the temperature of the fluid, without affecting the indicated voltage. The indicator responds only to changes in the output voltage source 28' which various directly with the fluid level.

In accordance with this theory it is obvious that this gauge may be used with a wide variety of fluids, the only requirement for accuracy being that the fluids be homogeneous. At present, the gauge has been tested with a variety of liquids including gasoline in various degrees of contamination, tap water, lubricating oil, transmission fluid and hydraulic brake fluid and such deviations as appear in the output have been within the range of experimental error.

It is apparent that by designing the resistance element 28 to produce a non-linear potential gradient in the fluid, for example, by varying the spacing between turns, the indicator can be calibrated to produce volume readings for tanks of irregular section, or the indicator scale can be expanded to produce increase resolution at any desired tank level.

The invention claimed is:
1. Fluid level gauging apparatus comprising
   means for establishing an electrical potential gradient extending from the minimum depth of the fluid to be gauged to the surface of said fluid,
   a conductive probe situated adjacent said potential gradient means and isolated therefrom except through the medium of the fluid being gauged, said probe assuming a potential directly related to the potential at the surface of said fluid, said surface potential being generated by said potential gradient means, and
   means for determining and remotely indicating the potential of said probe.

2. Apparatus as claimed in claim 1 wherein said potential gradient means comprises
   a resistance element, and
   means for producing a continuous flow of electrical current through said resistance element.

3. Apparatus as claimed in claim 1 wherein said potential gradient means comprises
   a resistance element extending through said fluid from the minimum depth to be gauged to the maximum depth to be gauged, and fluid being in electrical contact with said resistance element, and
   means for producing a continuous flow of electrical current through said resistance element.

4. Apparatus as claimed in claim 3 wherein said probe is situated adjacent said resistance element and is substantially coextensive therewith.

5. Apparatus as claimed in claim 4 wherein said means for producing current in said resistance element comprises
   a bi-polar source of direct voltage, said resistance element being connected between the poles of said source, one of the poles serving as reference potential, said probe being isolated from said source and said resistance element except through the medium of the fluid being gauged, and
   wherein said potential determining means is arranged to determine the potential between said probe and said reference potential.

6. Apparatus as claimed in claim 5 wherein said potential determining means includes a high input impedance amplifier.

7. Apparatus as claimed in claim 6 with additional faces of said support elements defining a reference plane, impedance amplifier, and
   electrical metering means providing an indication of the output of said additional amplifying means.

8. A floatless fluid level gauge comprising
   a sensor including a resistance element extending within the vessel containing the fluid to be gauged, said element extending from the minimum depth of fluid to be gauged to the maximum depth of fluid to be gauged and being in intimate contact with said fluid along the portion of said element immersed in said fluid, and a conductive probe situated adjacent said resistance element and isolated therefrom except through the medium of the fluid being gauged and being coextensive with said resistive element in intimate contact with said fluid;
   a direct voltage source having opposite poles connected to end terminals of said resistance element to create a voltage drop along the length of said resistance element, said voltage drop causing a potential gradient to exist within said fluid along the immersed length of said element, the resulting potential at the surface of said fluid being dependent upon the depth of immersion of said resistance element; and means for determining and indicating the potential of said probe due to said potential gradient within said fluid.

9. Apparatus as claimed in claim 8 with additionally, means for electrostatically shielding said sensor.

10. Apparatus as claimed in claim 8 wherein said resistance element comprises a length of resistance wire.

11. Apparatus as claimed in claim 10 wherein said resistance wire is helically disposed coaxially with said probe.

12. Apparatus as claimed in claim 8 wherein said potential determining and indicating means includes
   a field effect transistor having gate, source and drain electrodes, said gate electrode being connected to said probe, said source and drain electrodes being connected to opposite poles of said voltage source, the connection for one of said last named electrodes being completed through a load.

13. Apparatus as claimed in claim 12 wherein said potential determining and indicating means includes a second transistor having input and output electrodes, said input electrode being connected to the load of said field effect transistor, and
   an indicator in circuit with an output electrode of said second transistor.

14. Apparatus as claimed in claim 13 with additionally an integrating capacitor connected to the gate electrode of said field effect transistor for smoothing fluctuations in the potential of said probe.

References Cited

UNITED STATES PATENTS

| | | | |
|---|---|---|---|
| 2,398,375 | 4/1946 | Heenan | 73—301 |
| 3,003,355 | 10/1961 | Wright | 73—304 |
| 2,931,225 | 4/1960 | Plenger | 73—301 XR |

DONALD O. WOODIEL, Primary Examiner